(12) United States Patent
Hosoi (10) Patent No.: US 11,128,761 B2
(45) Date of Patent: Sep. 21, 2021

(54) IMAGE FORMING SYSTEM, CONTROL METHOD OF IMAGE FORMING SYSTEM, AND CONTROL PROGRAM OF IMAGE FORMING SYSTEM

(71) Applicant: Konica Minolta, Inc., Tokyo (JP)

(72) Inventor: Kenichi Hosoi, Kawaguchi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/800,502

(22) Filed: Feb. 25, 2020

(65) Prior Publication Data
US 2020/0322487 A1 Oct. 8, 2020

(30) Foreign Application Priority Data

Apr. 4, 2019 (JP) .............................. JP2019-072160

(51) Int. Cl.
*H04N 1/00* (2006.01)

(52) U.S. Cl.
CPC ..... *H04N 1/00037* (2013.01); *H04N 1/00015* (2013.01); *H04N 1/00029* (2013.01)

(58) Field of Classification Search
CPC ........... H04N 1/00037; H04N 1/00029; H04N 1/00015
See application file for complete search history.

(56) References Cited

U.S. PATENT DOCUMENTS

| 10,440,194 | B1* | 10/2019 | Shimatani | .......... | H04N 1/00037 |
| 2005/0063721 | A1* | 3/2005 | Nakayama | ......... | G03G 15/0121 |
| | | | | | 399/49 |
| 2007/0144362 | A1* | 6/2007 | Takata | ............... | G03G 15/0173 |
| | | | | | 101/33 |
| 2008/0231917 | A1* | 9/2008 | Tsukahara | .......... | H04N 1/00013 |
| | | | | | 358/475 |
| 2008/0240741 | A1* | 10/2008 | Sasama | ................ | G03G 21/206 |
| | | | | | 399/9 |
| 2010/0060952 | A1* | 3/2010 | Hayashi | ............. | H04N 1/00071 |
| | | | | | 358/474 |
| 2012/0263483 | A1* | 10/2012 | Suzuki | ............... | G03G 15/5062 |
| | | | | | 399/43 |

(Continued)

FOREIGN PATENT DOCUMENTS

JP 2013107314 A 6/2013

*Primary Examiner* — Ted W Barnes
(74) *Attorney, Agent, or Firm* — Lucas & Mercanti, LLP (57) ABSTRACT

Provided is an image forming system that can prevent unnecessary down time and spoiled paper from being caused, thereby improving productivity. The image forming system includes an image forming portion, a detecting portion, and a controlling portion. When an abnormality has been detected by the detecting portion, when a reading portion for reading an image formed on a recording medium by the printing operation of the image forming portion is provided, the controlling portion causes the reading portion to function to continue the printing operation, and at the detection of the abnormality on the basis of the read image, stops the printing operation to cause a notifying portion to perform notification related to the abnormality, and when the reading portion is not provided, the controlling portion stops the printing operation to cause the notifying portion to perform the notification related to the detected abnormality.

15 Claims, 6 Drawing Sheets

(56) References Cited

U.S. PATENT DOCUMENTS

| | | | |
|---|---|---|---|
| 2013/0148143 A1* | 6/2013 | Ooyanagi | H04N 1/00015 358/1.12 |
| 2014/0153939 A1* | 6/2014 | Uno | G03G 15/50 399/34 |
| 2014/0300918 A1* | 10/2014 | Kiriyama | B42C 19/08 358/1.14 |
| 2015/0170008 A1* | 6/2015 | Hashizume | H04N 1/00037 358/1.15 |
| 2017/0057266 A1* | 3/2017 | Kimura | H04N 1/00039 |
| 2017/0244862 A1* | 8/2017 | Nishizawa | H04N 1/00811 |
| 2018/0063339 A1* | 3/2018 | Pantin | H04N 1/00076 |
| 2018/0091678 A1* | 3/2018 | Omoya | H04N 1/00037 |
| 2018/0262626 A1* | 9/2018 | Genda | H04N 1/00005 |
| 2019/0033765 A1* | 1/2019 | Haga | G03G 15/5062 |
| 2019/0068797 A1* | 2/2019 | Kaminaka | H04N 1/0009 |
| 2019/0098174 A1* | 3/2019 | Kanaya | H04N 1/00037 |
| 2019/0121586 A1* | 4/2019 | Tsukamoto | G06F 3/1234 |
| 2019/0174013 A1* | 6/2019 | Yamanaka | H04N 1/00037 |
| 2019/0227474 A1* | 7/2019 | Isamikawa | G03G 15/55 |
| 2019/0238685 A1* | 8/2019 | Tsukamoto | H04N 1/00029 |
| 2019/0281171 A1* | 9/2019 | Hayashi | G06K 9/46 |
| 2019/0306328 A1* | 10/2019 | Kodama | H04N 1/00244 |
| 2019/0317441 A1* | 10/2019 | Honma | G03G 15/55 |
| 2019/0354054 A1* | 11/2019 | Yamamoto | G03G 15/5062 |
| 2020/0068081 A1* | 2/2020 | Kurohata | H04N 1/00005 |
| 2020/0076959 A1* | 3/2020 | Takahashi | H04N 1/00013 |
| 2020/0106892 A1* | 4/2020 | Honda | H04N 1/00037 |
| 2020/0128135 A1* | 4/2020 | Matsushita | H04N 1/00135 |
| 2020/0195798 A1* | 6/2020 | Izawa | H04N 1/00734 |
| 2020/0228668 A1* | 7/2020 | Yamazaki | H04N 1/0005 |
| 2020/0233618 A1* | 7/2020 | Ayukawa | G06F 3/1218 |
| 2020/0236225 A1* | 7/2020 | Hongo | H04N 1/00045 |
| 2020/0241816 A1* | 7/2020 | Miyazaki | G06K 15/408 |
| 2020/0314251 A1* | 10/2020 | Kobayashi | H04N 1/00076 |

* cited by examiner

FIG. 8
Tc2

IMAGE FORMING SYSTEM, CONTROL METHOD OF IMAGE FORMING SYSTEM, AND CONTROL PROGRAM OF IMAGE FORMING SYSTEM

CROSS-REFERENCE TO RELATED APPLICATIONS

The entire disclosure of Japanese Patent Application No. 2019-72160, filed on Apr. 4, 2019 is incorporated herein by reference in its entirety.

BACKGROUND

Technological Field

The present invention relates to an image forming system, a control method of the image forming system, and a control program of the image forming system.

Description of the Related Art

There is a technology related to an inspecting device for inspecting an image formed by an image forming apparatus that is disclosed in Patent Literature 1 (JP-2013-107314A). Patent Literature 1 describes that a printed sheet is inspected by comparing image data (scan data) acquired by reading the printed sheet by a product inspecting sensor and reference data transmitted from the image forming apparatus, and the type of a printing failure whose result determined by a controlling portion is unsatisfactory is determined whether the printing failure is a continuous printing failure, an intermittent printing failure, or a sudden printing failure. Also, in particular, when the intermittent printing failure has been detected, the printing process of the image forming apparatus is stopped, so that a large amount of sheets can be prevented from being lost.

CITATION LIST

Patent Literature

Patent Literature 1: JP-2013-107314A

SUMMARY

By the way, the image forming apparatus detects the abnormality of each functioning portion on the basis of the signal from each operating portion of the apparatus or the signal from the sensor provided in each portion of the apparatus, and at the detection of the abnormality, notifies that the abnormality has been caused, thereby stopping the image forming operation. However, in such a configuration, the detected abnormality of each functioning portion, even if not affecting the output image, stops the image forming operation, which is the causing factor of unnecessary down time and spoiled paper.

Accordingly, an object of the present invention is to provide an image forming system that can prevent unnecessary down time and spoiled paper from being caused, thereby improving productivity. Also, another object of the present invention is to provide a control method of such an image forming system, and a further object of the present invention is to provide a control program of such an image forming system.

To achieve at least one of the abovementioned objects, according to an aspect of the present invention, an image forming system reflecting one aspect of the present invention is provided which comprises an image forming portion, a detecting portion for detecting an abnormality related to the image forming portion, and a controlling portion for controlling the driving of the image forming portion. When the abnormality has been detected by the detecting portion, when a reading portion for reading an image formed on a recording medium by the printing operation of the image forming portion is provided, the controlling portion causes the reading portion to function to continue the printing operation of the image forming portion, and at the detection of the abnormality on the basis of the image read by the reading portion, stops the printing operation of the image forming portion to cause a notifying portion to perform notification related to the abnormality, and when the reading portion for reading the image formed on the recording medium by the printing operation of the image forming portion is not provided, the controlling portion stops the printing operation of the image forming portion to cause the notifying portion to perform the notification related to the detected abnormality. Also, the present invention provides a control method of such an image forming system, and a control program of such an image forming system.

BRIEF DESCRIPTION OF THE DRAWINGS

The advantages and features provided by embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Embodiments to which the present invention is applied will be described below in detail with reference to the drawings. However, the scope of the invention is not limited to the disclosed embodiments.

Configuration of Image Forming System According to Embodiments

Figure 1:
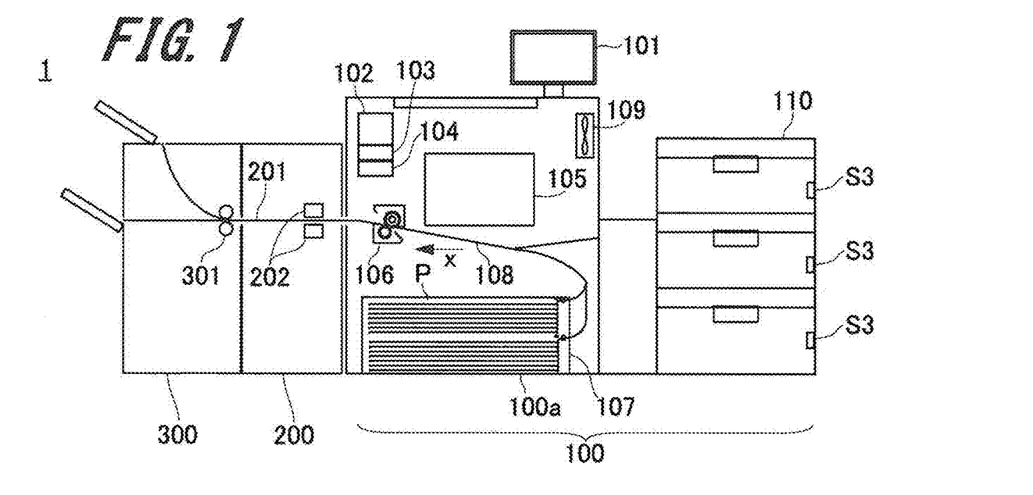
FIG. 1 is a schematic diagram illustrating the overall configuration of an image forming system according to an embodiment of the present invention.
Figure 2:
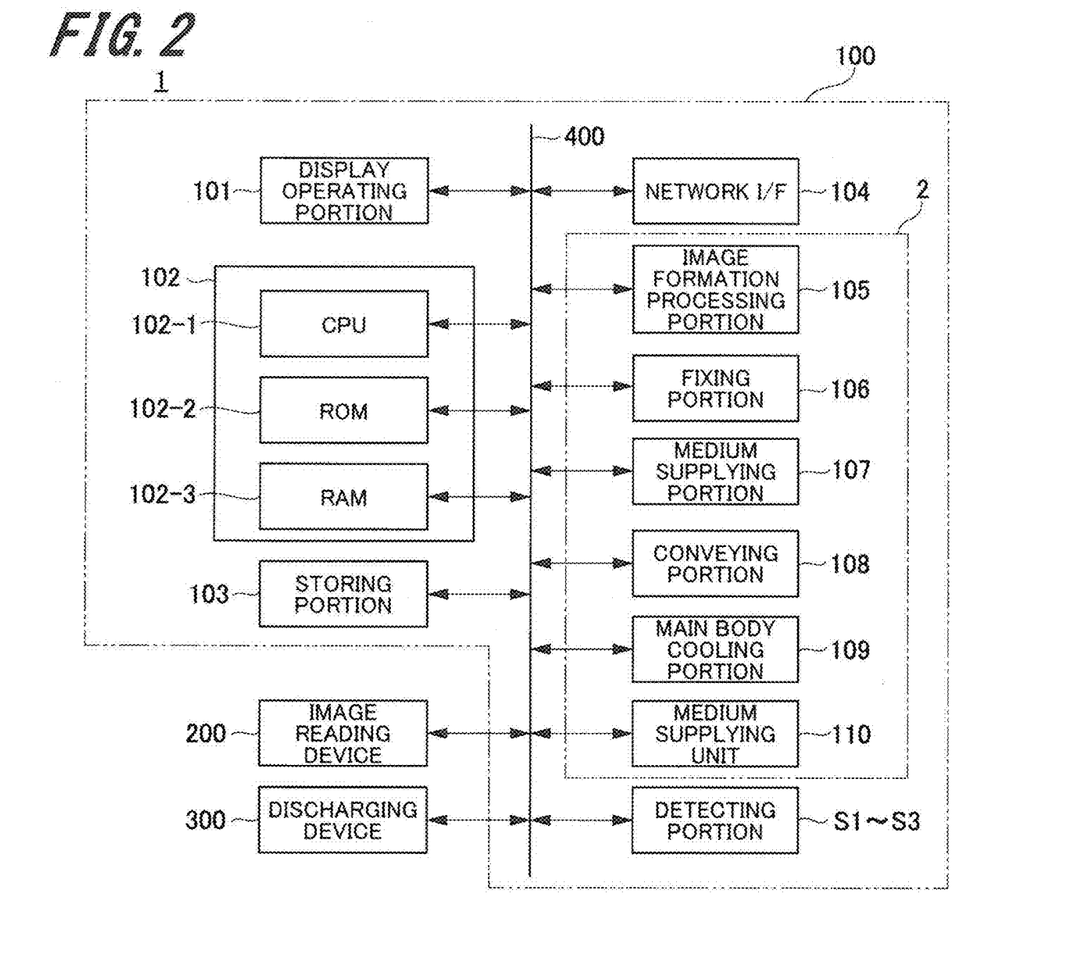
FIG. 2 is a block diagram of the entire image forming system according to an embodiment of the present invention.

FIG. 1 is a schematic diagram illustrating the overall configuration of an image forming system according to the embodiment of the present invention. Also, FIG. 2 is a block diagram of the entire image forming system according to the embodiment of the present invention. An image forming system 1 illustrated in these drawings includes an image forming apparatus 100 for forming an image onto a recording medium P. The recording medium P is, for example, sheet-like. Also, the image forming system 1 includes an image reading device 200 for reading the image formed on the recording medium P in the image forming apparatus 100, and a discharging device 300 for discharging, onto a predetermined tray, the image-formed recording medium P in the image forming apparatus 100. These respective devices are mutually connected by a bus 400 (see FIG. 2), and are configured as follows.

Image Forming Apparatus 100

The image forming apparatus 100 includes a display operating portion 101, a controlling portion 102, a storing portion 103, a network interface 104, an image formation processing portion 105, a fixing portion 106, a medium supplying portion 107, a medium conveying portion 108, and a main body cooling portion 109. These configure, for example, an apparatus main body 100a of the image forming apparatus 100. Also, the image forming apparatus 100 includes a medium supplying unit 110 separated from the apparatus main body 100a.

Among the above components, the image formation processing portion 105, the fixing portion 106, the medium supplying portion 107, the medium conveying portion 108, the main body cooling portion 109, and the medium supplying unit 110 configure an image forming portion. The detail of these components configuring the image forming apparatus 100 will be described below.

Display Operating Portion 101

The display operating portion 101 is a portion for inputting the setting of a job performed by using this image forming apparatus 100, and has a display panel and operation buttons. The operation buttons may include a touch panel provided integrally with the display panel. It should be noted that such a display operating portion 101 is also a notifying portion for notifying the state of the image forming system 1 to a user. Also, such a display operating portion 101 that is also the notifying portion may be a personal computer or other external devices connected to the image forming apparatus 100.

Controlling Portion 102

The controlling portion 102 controls the operation of each portion of the image forming system 1 including the image forming apparatus 100 according to the operation on the display operating portion 101 or a reception signal from the external device, such as the personal computer, connected to the image forming apparatus 100, and is a controlling portion of the entire image forming system 1. Such a controlling portion 102 is configured of a calculator. The calculator is so-called hardware used as a computer. The calculator includes a CPU (Central Processing Unit) 102-1, a ROM (Read Only Memory) 102-2, and a RAM (Random Access Memory) 102-3.

The process performed in this controlling portion 102 performs characteristic control described in detail in a control method of the image forming system described later. The procedure of this control includes, as an image forming program for controlling the operation of each portion of the image forming apparatus 100, a program stored in the ROM or a program loaded from the external device to the RAM or the storing portion 103 and stored in the RAM or the storing portion 103. These programs cause the calculator to execute steps described in the control method of the image forming system described later.

Figure 3:
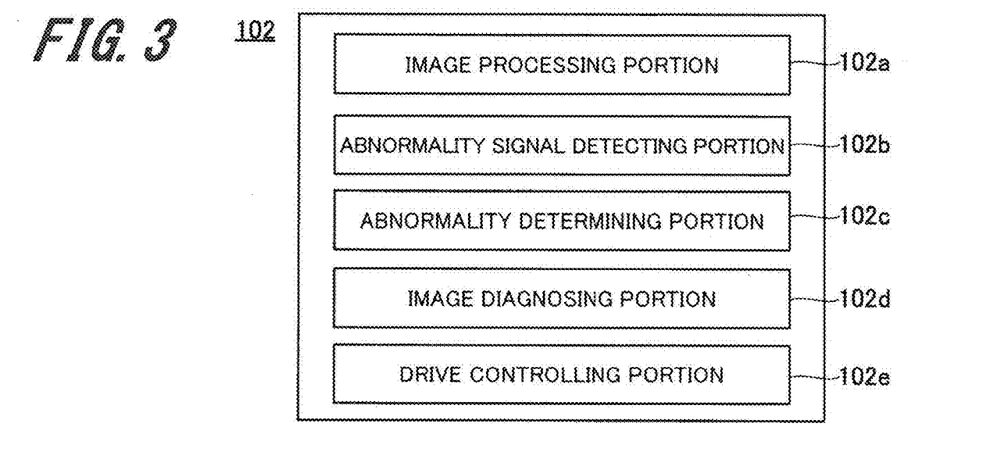
FIG. 3 is a function block diagram of a controlling portion of the image forming system according to an embodiment of the present invention.

FIG. 3 is a function block diagram of the controlling portion 102 of the image forming system 1 according to the embodiment of the present invention. As illustrated in this drawing, the controlling portion 102 has an image processing portion 102a, an abnormality signal detecting portion 102b, an abnormality determining portion 102c, an image diagnosing portion 102d, and a drive controlling portion 102e. The following configurations of these functional elements will be described with reference to FIG. 3 and FIGS. 1 and 2 previously illustrated.

Image Processing Portion 102a

The image processing portion 102a creates original image data for printing by subjecting the document data of the image to be formed onto the recording medium P by performing the printing job to a rasterization process. This image processing portion 102a may be, for example, a raster image processor (RIP). The document data of the image processed by the image processing portion 102a is, for example, the image inputted from the external device via the network interface. Also, when this image forming apparatus 100 has a document platen and a reading device for reading the image of the document placed on the document platen, the document data of the image processed by the image processing portion 102a may be the document data read from this reading device.

Abnormality Signal Detecting Portion 102b

The abnormality signal detecting portion 102b is a portion for detecting the abnormality of each portion of the image forming system 1 on the basis of the signal from each operating portion configuring the image forming system 1 or the signal from each of detecting portions S1 to S3 provided in the respective portions of the image forming system 1. Such an abnormality signal detecting portion 102b provides a threshold value to the signal intensity of each signal, and when each signal is outside of the threshold value range, it detects the abnormality of the operating portion that has generated the signal or the portion in which each of the detecting portions S1 to S3 that has generated the signal is provided.

Abnormality Determining Portion 102c

The abnormality determining portion 102c is a portion for determining whether or not the abnormality detected by the abnormality signal detecting portion 102b is a predetermined abnormality. The predetermined abnormality is an abnormality that does not lead to the mechanical damage of the image forming system 1, and is at least an abnormality that can convey the recording medium P to the image formation processing portion 105. On the contrary, an abnormality that is not the predetermined abnormality is an abnormality that leads to the mechanical damage of the image forming system 1, and is an abnormality in which the printing operation of an image forming portion 2 should be stopped.

Image Diagnosing Portion 102d

The image diagnosing portion 102d is a portion for detecting the abnormality of the reading image read by the image reading device 200. This image diagnosing portion 102d detects the abnormality of the reading image by comparing the reading image data of the reading image read by the image reading device 200 and reference image data stored in the storing portion 103.

The reference image data is one of the original image data created by the image processing portion 102a for the image formation and the reading image data in which the image that has already been formed on the recording medium P and by visual inspection, has been determined to have no abnormality is read by the image reading device 200.

Drive Controlling Portion 102e

The drive controlling portion 102e controls the operation of each operating portion configuring the image forming apparatus 100, and forms the image onto the recording medium P. Also, the drive controlling portion 102e controls the operation of each operating portion configuring the image reading device 200 described next, and reads the image formed on the recording medium P. Further, the drive controlling portion 102e controls the operation of the operating portion configuring the discharging device 300, and discharges the image-formed recording medium P in a divided manner. Also, the drive controlling portion 102e processes information notified to the display operating portion 101 or the external device connected to this image forming system 1.

Storing Portion 103

Also, on the basis of the operation on the display operating portion 101 and the instruction from the controlling portion 102, the storing portion 103 illustrated in FIGS. 1 and 2 stores the original image data created by the image processing portion 102a, and stores the reading image data read by the image reading device 200. Also, the storing portion 103 stores the original image data for forming a test chart used for the image diagnosis. Further, the storing portion 103 may store a control program of the image forming apparatus 100 and other information.

Network Interface 104

The network interface 104 exchanges the data between the image forming system 1 and the personal computer or other external devices.

Image Formation Processing Portion 105

The image formation processing portion 105 is a portion for forming the image by printing onto the principal face of the recording medium P according to the instruction from the controlling portion 102. Here, the image formation processing portion 105 that will be described as an example is of the electrophotographic type, but is not limited to this, and may be, for example, of the ink jet type and other types.

Figure 4:
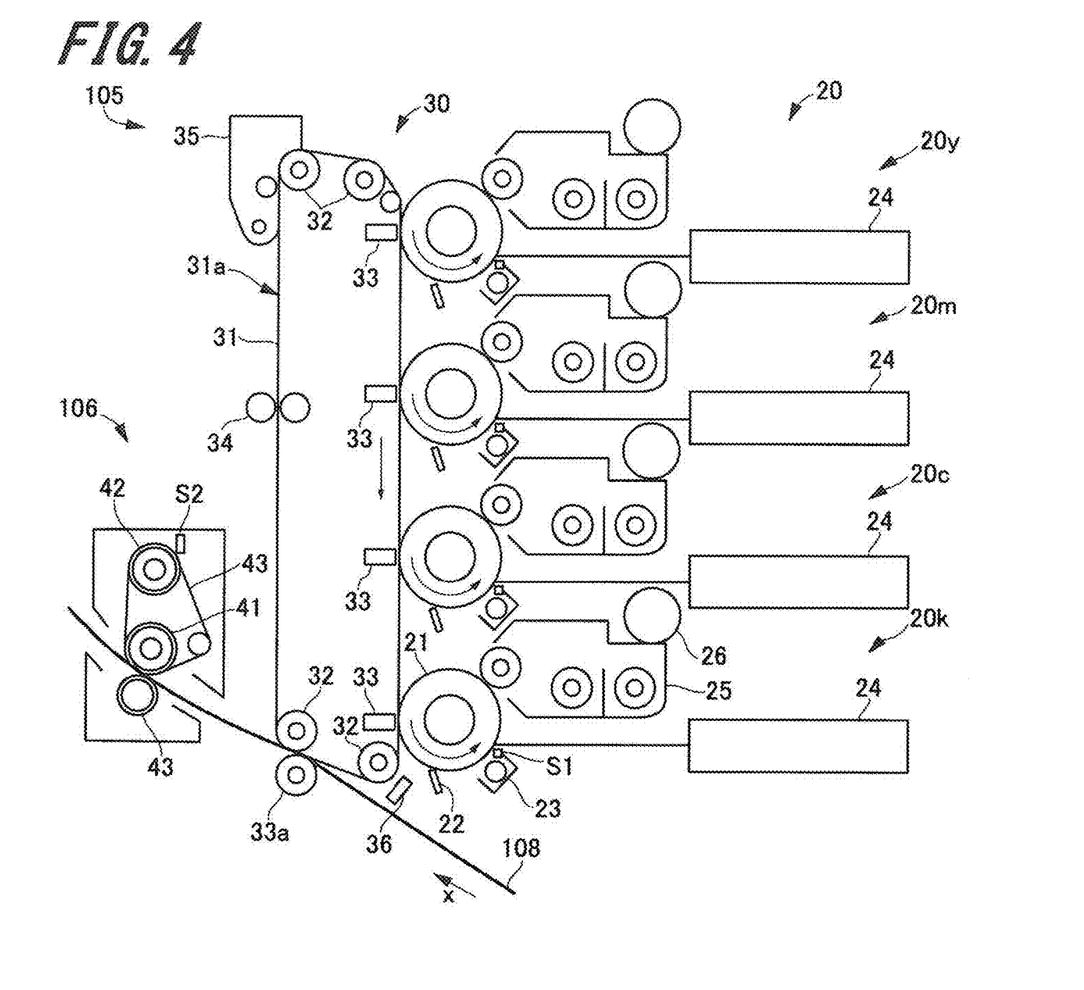
FIG. 4 is a block diagram of an image forming portion according to an embodiment of the present invention.

FIG. 4 is a block diagram of the image formation processing portion 105 according to the embodiment of the present invention, and illustrates the configuration of the image formation processing portion 105 of the electrophotographic type. The configuration of the image formation processing portion 105 will be described below on the basis of FIG. 4 with reference to FIG. 3 previously illustrated. As illustrated in FIG. 4, the image formation processing portion 105 includes a toner image forming portion 20 and a transferring portion 30. The configurations of these are as follows.

Toner Image Forming Portion 20

The toner image forming portion 20 has four image forming units 20y, 20m, 20c, and 20k for forming toner images in respective colors of, for example, yellow (Y), magenta (M), cyan (C), and black (K). Each of the respective image forming units 20y, 20m, 20c, and 20k has a photosensitive drum 21. Further, around the photosensitive drum 21, a drum cleaner 22, an electrically charging portion 23, an exposing portion 24, and a developing portion 25 are disposed along the rotation direction of the photosensitive drum 21. To the developing portion 25, a toner supplying portion 26 is connected.

The photosensitive drum 21 is one of image bearing bodies on which the toner images are formed, and has a drum shape to be rotated by a driving motor, its drum-shaped side circumferential surface being an image bearing face. In the toner image forming portion 20, the photosensitive drums 21 of the respective image forming units 20y, 20m, 20c, and 20k are disposed parallel to the axial direction.

The drum cleaner 22 removes the toner on the image bearing face of the photosensitive drum 21.

The electrically charging portion 23 uniformly electrically charges the image bearing face of the photosensitive drum 21 from which the toner is removed by the drum cleaner 22. This electrically charging portion 23 includes a wire-like electrode band, and a cleaning member for removing the toner that adheres onto the electrode band. The cleaning member removes the toner that adheres onto the electrode band while being moved along the wire-like electrode band by the motor driving.

The exposing portion 24 exposure scans the electrically charged image bearing face to form an electrostatic latent image onto the image bearing face. This exposing portion 24 includes, for example, a polygon mirror, and performs the exposure scanning by the driving of the polygon mirror. The exposure scanning of the exposing portion 24 is performed on the basis of the original image data created by the image processing portion 102a of the controlling portion 102.

The developing portion 25 supplies the electrically charged toner onto the image bearing face of the photosensitive drum 21 on which the electrostatic latent image is formed, and thus causes the toner in each color to adhere onto the electrostatic latent image formed on the image bearing face of the photosensitive drum 21. Such a developing portion 25 includes, for example, a developing roller for absorbing the toner onto its surface by magnetic properties and supplying the absorbed toner onto the image bearing face of the photosensitive drum 21, and a screw-shaped stirring member for supplying the toner to the developing roller.

The toner supplying portion 26 supplies the toner to the developing portion 25, and conveys the toner to the developing portion 25 by using, for example, a screw pump, to supply the toner to the developing portion 25.

In the toner image forming portion 20 configured of the above respective members, the yellow toner image is formed on an image bearing face 21a of the photosensitive drum 21 of the image forming unit 20y, the magenta toner image is formed on the surface of the photosensitive drum 21 of the image forming unit 20m, the cyan toner image is formed on the photosensitive drum 21 of the image forming unit 20c, and the black toner image is formed on the photosensitive drum 21 of the image forming unit 20k.

Also, in the toner image forming portion 20 having the above configuration, the electrically charging portion 23 is provided with a photosensor as the detecting portion S1 for detecting the position of the cleaning member of the electrode band. The signal detected by this detecting portion S1 is transmitted to the abnormality signal detecting portion 102b and is analyzed, thereby detecting the abnormality of the electrically charging portion 23, that is, the abnormality of the operation failure of the cleaning member of the electrically charging portion 23.

Also, the respective driving signals of the driving motor of the photosensitive drum 21, the polygon driving motor of the exposing portion 24, the driving motor of the developing roller and the stirring member of the developing portion 25, and further, the screw pump of the toner supplying portion 26 are transmitted to the abnormality signal detecting portion 102b and are analyzed, thereby detecting the operation failure abnormalities of these respective portions.

Among the above operation failure abnormalities, the operation failures of the cleaning member of the electrically charging portion 23 and the screw pump of the toner supplying portion 26 are the abnormalities that do not lead to the mechanical damage of the image forming system 1. Thus, the abnormality determining portion 102c of the controlling portion 102 determines that these abnormalities are the predetermined abnormalities. On the contrary, the operation failures of the driving motor of the photosensitive drum 21, the polygon driving motor of the exposing portion 24, and the driving motor of the developing roller and the stirring member of the developing portion 25 are the abnormalities that lead to the mechanical damage of the image forming system 1. Thus, the abnormality determining portion 102c of the controlling portion 102 determines that these abnormalities are not the predetermined abnormalities, and are the abnormalities in which the printing operation of the image forming portion 2 should be stopped.

Transferring Portion 30

The transferring portion 30 is disposed in parallel with the image forming portion 20. This transferring portion 30 includes an intermediate transfer belt 31 configured as an endless belt rotated, a plurality of rollers 32 in contact with the inner periphery of the intermediate transfer belt 31, and a plurality of primary transferring portions 33. Also, the transferring portion 30 is provided with a secondary transferring roller 33a, static eliminating rollers 34, a cleaning unit 35, and an image density sensor (IDC sensor) 36.

Among these, the intermediate transfer belt 31 is disposed in the state of being entrained on the plurality of rollers 32, its outer peripheral face being an image bearing face 31a. Such an intermediate transfer belt 31 is rotated in the direction opposite the rotation of each of the photosensitive drums 21 of the image forming units 20y, 20m, 20c, and 20k, and the image bearing face 31a is disposed in the state of successively coming into contact with all of the plurality of photosensitive drums 21. Here, the intermediate transfer belt 31 and each of the photosensitive drums 21 come into contact with each other in the upstream of the drum cleaner 22 and in the downstream of the developing portion 25 with respect to a rotation direction x of each of the photosensitive drums 21.

The plurality of rollers 32 are disposed on the inner peripheral side of the intermediate transfer belt 31 so as to cause the image bearing face 31a of the intermediate transfer belt 31 to come into contact with the photosensitive drums 21. One of these rollers 32 is configured as a driving roller for rotating the intermediate transfer belt 31.

The primary transferring portions 33 are disposed in the state of sandwiching the intermediate transfer belt 31 between the primary transferring portions 33 and the respective photosensitive drums 21 at the respective positions opposite the photosensitive drums 21 of the respective image forming units 20y, 20m, 20c, and 20k on the inner peripheral side of the intermediate transfer belt 31. To these primary transferring portions 33, voltage having an opposite polarity to the polarity of the toners is applied, so that the primary transferring portions 33 transfer the toners that adhere onto the image bearing faces of the photosensitive drums 21, onto the image bearing face 31a of the intermediate transfer belt 31.

The secondary transferring roller 33a is disposed in the state of sandwiching the intermediate transfer belt 31 between the secondary transferring roller 33a and one of the plurality of rollers 32 at the position opposite the roller 32 on the image bearing face 31a side of the intermediate transfer belt 31. And, a nipping portion in which the secondary transferring roller 33a and the roller 32 come into contact with each other is at the transfer position where the toner image formed on the image bearing face 31a of the intermediate transfer belt 31 is transferred onto the recording medium P.

The static eliminating rollers 34 are provided in the state of sandwiching the intermediate transfer belt 31 therebetween on the downstream side of the secondary transferring roller 33a and on the upstream side of the primary transferring portions 33 in a rotation direction x of the intermediate transfer belt 31, and removes the electric charge of the intermediate transfer belt 31.

The cleaning unit 35 is disposed to be opposite the image bearing face 31a of the intermediate transfer belt 31 on the outer peripheral side of the intermediate transfer belt 31 between the static eliminating rollers 34 and the primary transferring portion 33 of the image forming unit 20y. This cleaning unit 35 removes the toner that remains on the image bearing face 31a of the intermediate transfer belt 31.

The image density sensor 36 is provided in the state of being opposite the image bearing face 31a in the downstream of the toner image forming portion 20 and in the upstream of the secondary transferring roller 33a with respect to the rotation direction x2 of the intermediate transfer belt 31. This image density sensor 36 detects the density of the toner image transferred onto the image bearing face 31a of the intermediate transfer belt 31, and is used for performing a stabilization process for correcting the periodical unevenness of the toner density.

Here, in the image forming apparatus 100, the periodical unevenness is caused in the toner density due to the rotation runout of the rotor, such as the photosensitive drum 21 and the developing roller of the developing portion 25. Thus, the image forming apparatus 100 periodically performs the above stabilization process, thereby preventing the periodical unevenness from being caused in the toner density. The image density sensor 36 is used for detecting the toner density in the toner patch formed on the image bearing face of the photosensitive drum 21 when such a stabilization process is performed.

In the transferring portion 30 having the above configuration, the driving signal of the driving roller among the plurality of rollers 32 disposed on the inner peripheral side of the intermediate transfer belt 31 is transmitted to the abnormality signal detecting portion 102b and is analyzed, thereby detecting the operation failure abnormality of the intermediate transfer belt 31. This operation failure abnormality is the abnormality that leads to the mechanical damage of the image forming system 1. Thus, the abnormality determining portion 102c of the controlling portion 102 determines that this abnormality is not the predetermined abnormality, and is the abnormality in which the printing operation of the image forming portion 2 should be stopped.

Also, the signal from the image density sensor 36 is transmitted to the abnormality signal detecting portion 102b and is analyzed, thereby detecting, as the abnormality of the stabilization process, the detection failure due to the adherence stain of the toner onto the toner density detection face of the image density sensor 36. In this case, when the toner density indicated by the signal read by the image density sensor 36 is higher than the actual toner density, it is detected as the abnormality of the stabilization process caused by the adherence stain of the image density sensor 36. Such a stabilization process abnormality is the abnormality that does not lead to the mechanical damage of the image forming system 1. Thus, the abnormality determining portion 102c of the controlling portion 102 determines that this stabilization process abnormality is the predetermined abnormality.

Fixing Portion 106

The fixing portion 106 is disposed on the downstream side of the image formation processing portion 105 with respect to a conveying direction x of the recording medium P of the medium conveying portion 108 described next. The fixing portion 106 includes a heating roller 41, a driving roller 42, and a pressing roller 43 disposed in parallel. The heating roller 41 incorporates a heating member, such as a halogen heater. Between the heating roller 41 and the driving roller 42, a fixing belt 44 is entrained, and the heating roller 41 and the fixing belt 44 are rotated so as to follow the rotation of the driving roller 42. Also, the pressing roller 43 is biased by a biasing member, not illustrated here, and is pressed onto the heating roller 41 via the fixing belt 44.

In such a fixing portion 106, the heating roller 41 and the pressing roller 43 configure a nipping portion for nipping the recording medium P conveyed by the medium conveying portion 108, and the nipped recording medium P is heated, so that the toner image transferred onto the recording medium P is fixed onto the recording medium P. Also, by the rotation of the heating roller 41, the fixing belt 44, and the pressing roller 43 that follow the rotation of the driving roller 42, the nipped recording medium P is conveyed to the image reading device 200 (see FIG. 1).

In the fixing portion 106 having the above configuration, a temperature sensor is provided as the detecting portion S2 near the surface of the fixing belt 44. The signal detected by this detecting portion S2 is transmitted to the abnormality signal detecting portion 102b and is analyzed, thereby detecting the abnormality of the fixing temperature of the recording medium P of the heating roller 41. This abnormality is the abnormality that leads to the mechanical damage of the image forming system 1. Thus, the abnormality determining portion 102c of the controlling portion 102 determines that this abnormality is not the predetermined abnormality, and is the abnormality in which the printing operation of the image forming portion 2 should be stopped.

Medium Supplying Portion 107

Returning to FIGS. 1 to 3, the medium supplying portion 107 is a portion for supplying the recording medium P to the medium conveying portion 108 according to the instruction from the controlling portion 102. Such a medium supplying portion 107 supplies each recording medium P from an accommodating portion for accommodating a large amount of recording media P to the medium conveying portion 108.

Medium Conveying Portion 108

The medium conveying portion 108 is a portion for conveying the recording medium P to the image formation processing portion 105 according to the instruction from the controlling portion 102. Such a medium conveying portion 108 conveys the recording medium P supplied from the medium supplying portion 107 to the image formation processing portion 105 at a predetermined timing and speed, and further, conveys it from the image formation processing portion 105 to the fixing portion 106.

Main Body Cooling Portion 109

The main body cooling portion 109 cools the portion of the image forming apparatus 100 in which the image formation processing portion 105, the fixing portion 106, and the medium supplying portion 107 are accommodated. Such a main body cooling portion 109 is, for example, a cooling fan by the motor driving. The driving signal of such a main body cooling portion 109 is transmitted to the abnormality signal detecting portion 102b and is analyzed, thereby detecting the operation failure abnormality of the main body cooling portion 109. This operation failure abnormality is the abnormality that does not lead to the mechanical damage of the image forming system 1. Thus, the abnormality determining portion 102c determines that this abnormality is the predetermined abnormality.

Medium Supplying Unit 110

The medium supplying unit 110 is a portion for accommodating a large amount of recording media P and supplying each recording medium P to the medium conveying portion 108 according to the instruction from the controlling portion 102 of the image forming apparatus 100. Such a medium supplying unit 110 has a supply driving portion for supplying each recording medium P from the accommodating portion for accommodating a large amount of recording media P to the medium conveying portion 108. Also, the medium supplying unit 110 is provided with a dehumidification heater, not illustrated, and maintains the inside of the accommodating portion for the recording media P in a dehumidification environment.

In such a medium supplying unit 110, the driving signal of the supply driving portion for the recording medium P is transmitted to the abnormality signal detecting portion 102b and is analyzed, thereby detecting the operation failure abnormality of the supplying of the recording medium P. Also, the medium supplying unit 110 is provided with a temperature sensor as the detecting portion S3 for detecting the temperature in the accommodating portion for the recording medium P. The signal detected by this detecting portion S3 is transmitted to the abnormality signal detecting portion 102b and is analyzed, thereby detecting the humidity abnormality in the accommodating portion for the recording medium P.

These abnormalities are the abnormalities that lead to the mechanical damage of the image forming system 1. Thus, the abnormality determining portion 102c determines that these abnormalities are not the predetermined abnormalities, and are the abnormalities in which the printing operation of the image forming portion 2 should be stopped.

The Image Reading Device 200

The image reading device 200 is a device for reading the image formed on the recording medium P in the image forming apparatus 100, and is disposed at the subsequent stage of the image forming apparatus 100. This image reading device 200 includes a medium conveying path 201 continued from the fixing portion 106 of the image forming apparatus 100, and an image reading portion 202 provided along the medium conveying path 201.

The medium conveying path 201 conveys the recording medium P conveyed from the fixing portion 106 to the subsequent discharging device 300. The image reading portion 202 may be, for example, a typical in-line sensor including a CCD and a CMOS sensor, and is disposed on the surface of the recording medium P conveyed along the medium conveying path 201.

The reading image data read by the image reading portion 202 is transmitted to the image diagnosing portion 102d, and is compared with the reference image data by the image diagnosing portion 102d, thereby detecting the abnormality of the reading image, that is, the abnormality of the image formed by the image formation processing portion 105.

It should be noted that the image reading portion 202 described above may be disposed at the subsequent stage of the fixing portion 106 of the apparatus main body 100a of the image forming apparatus 100. In this case, the image reading device 200 separated from the apparatus main body 100a of the image forming apparatus 100 is not required to be provided.

Discharging Device 300

The discharging device 300 is a portion for discharging the recording medium P conveyed from the image reading device 200 in a divided manner on an as-needed basis, according to the instruction from the controlling portion 102. Such a discharging device 300 has a discharge switching portion 301 for switching the discharge destination of the recording medium P conveyed from the image reading device 200.

Control Method of the Image Forming System

Next, the control method of the image forming system 1 having the above configuration will be described. The control method of the image forming system 1 described in each of the later embodiments is achieved in such a manner that on the basis of the setting of the job inputted from the display operating portion 101 or the external device connected to the image forming system 1, the CPU 102-1 configuring each portion of the controlling portion 102 controls the driving of each portion of the image forming system 1 on the basis of the control program of the image forming system 1 stored in the ROM 102-2, the RAM 102-3, and further, the storing portion 103.

Figure 5:
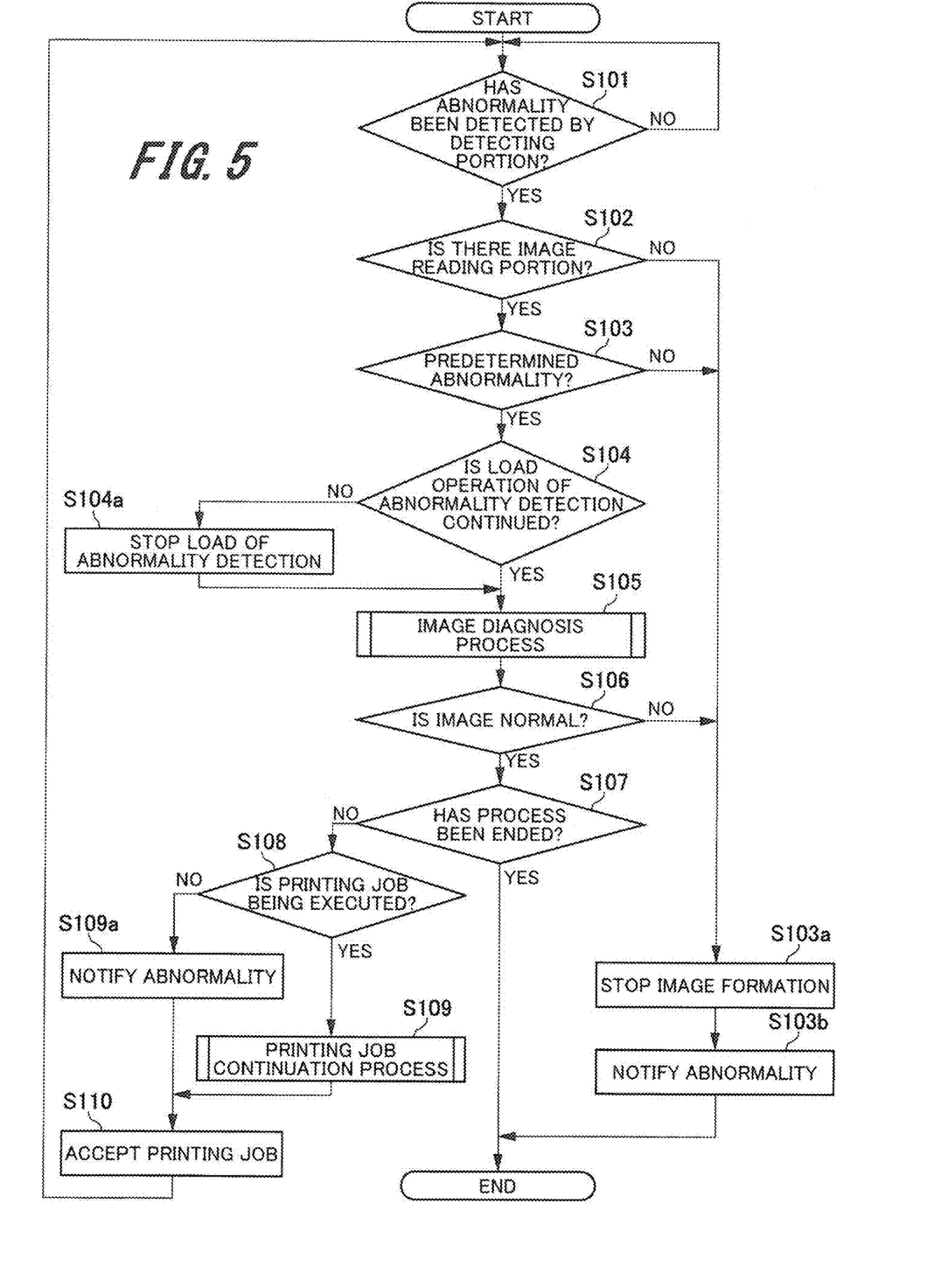
FIG. 5 is a flowchart (1) illustrating a control method of the image forming system according to an embodiment of the present invention.

FIG. 5 is a flowchart (1) illustrating the control method of the image forming system according to the embodiment of the present invention. The control method of the image forming system 1 according to the embodiment will be described below according to the flowchart in FIG. 5 with reference to FIGS. 1 to 4 previously illustrated.

Step S101

In step S101, the abnormality signal detecting portion 102b determines whether or not the abnormality has been detected, and continues the determination and is standby until it determines that the abnormality has been detected (YES). In this case, the abnormality signal detecting portion 102b analyzes the signals transmitted from the respective operating portions of the image forming portion 2 and the signals transmitted from the detecting portions S1 to S3 provided in the respective portions of the image forming system, thereby detecting the abnormality by the analysis of each of these signals. It should be noted that among the signals transmitted from the respective operating portions of the image forming portion 2, the signal from the image density sensor 36 is the signal transmitted when the periodic stabilization process is being performed.

When any one of these signals is outside of the threshold value range previously set to the respective portions, the abnormality signal detecting portion 102b determines that the abnormality has been detected (YES), and goes to subsequent step S102. Also, the abnormality signal detecting portion 102b identifies the operating portion of the image forming portion 2 in which the abnormality has been caused.

Step S102

In step S102, the drive controlling portion 102e determines whether or not this image forming system 1 is provided with the image reading portion 202. When the drive controlling portion 102e determines that the image forming system 1 is provided with the image reading portion 202 (YES), it goes to step S103. On the other hand, when the drive controlling portion 102e determines that the image forming system 1 is not provided with the image reading portion 202 (NO), it goes to step S103a.

Step S103a

In step S103a, the drive controlling portion 102e stops the printing operation of the image forming portion 2. In this case, when the printing job is being executed, the printing job is stopped. Also, when the printing job is not being executed and the printing job is being accepted, the acceptance of the printing job is stopped. Thereafter, the drive controlling portion 102e goes to step S103b.

Step S103b

In step S103b, the drive controlling portion 102e notifies the detection of the abnormality to the display operating portion 101 or the external device connected to this image forming system 1. In this case, together with the detection of the abnormality, the transmission source of the signal in which the abnormality has been detected, that is, the operating portion in which the abnormality has been detected, may be notified.

Step S103

On the other hand, in step S103, the abnormality determining portion 102c determines whether or not the abnormality detected by the abnormality signal detecting portion 102b in step S101 is the predetermined abnormality. Here, as described previously, the predetermined abnormality is the abnormality that does not lead to the mechanical damage of the image forming system 1. The abnormality of the cleaning member of the electrically charging portion 23, the abnormality of the screw pump of the toner supplying portion 26, the abnormality due to the toner adherence onto the image density sensor 36, the abnormality being the abnormality of the stabilization process, and the abnormality of the main body cooling portion 109 in the image formation processing portion 105 correspond to the predetermined abnormalities.

When the abnormality identified in step S101 corresponds to any one of the above predetermined abnormalities, the abnormality determining portion 102c determines that it is the predetermined abnormality (YES), and goes to subsequent step S104. On the other hand, when the abnormality identified in step S101 does not correspond to any of the above predetermined abnormalities, the abnormality determining portion 102c determines that it is not the predetermined abnormality (NO), and goes to step S103a. And, the printing operation of the image forming portion 2 is stopped.

Step S104

In step S104, the abnormality determining portion 102c determines whether or not the load operation in which the abnormality has been detected is continued. The load operation in which the abnormality has been detected is the operation of the operating portion that is the transmission source of the signal related to the abnormality detected by the abnormality signal detecting portion 102b in step S101. In this case, the abnormality determining portion 102c performs this determination on the basis of, for example, the setting of a service call.

As an example, when the predetermined abnormality detected by the abnormality signal detecting portion 102 in step S101 is the abnormality of the main body cooling portion 109, the abnormality determining portion 102c determines that the load operation in which the abnormality has been detected, that is, the operation of the main body cooling portion 109, is continued (YES), and goes to step S105. On the other hand, when the abnormality is the abnormality other than that, the abnormality determining portion 102c determines that the load operation in which the abnormality has been detected is not continued (NO), and goes to step S104a.

Step S104a

In step S104a, the drive controlling portion 102e stops the load operation in which the abnormality has been detected. For example, when the abnormality detected by the abnormality signal detecting portion 102b in step S101 is the abnormality of the cleaning member of the electrically charging portion 23 in the image formation processing portion 105, the driving of the cleaning member is stopped. Also, when the abnormality detected by the abnormality signal detecting portion 102b in step S101 is the abnormality of the screw pump of the toner supplying portion 26, the driving of the screw pump is stopped. Further, when the abnormality detected by the abnormality signal detecting portion 102b in step S101 is the abnormality due to the toner adherence onto the image density sensor 36, the abnormality being the abnormality of the stabilization process, the operation of the image density sensor 36 is stopped to stop the stabilization process.

Step S105

Figure 6:
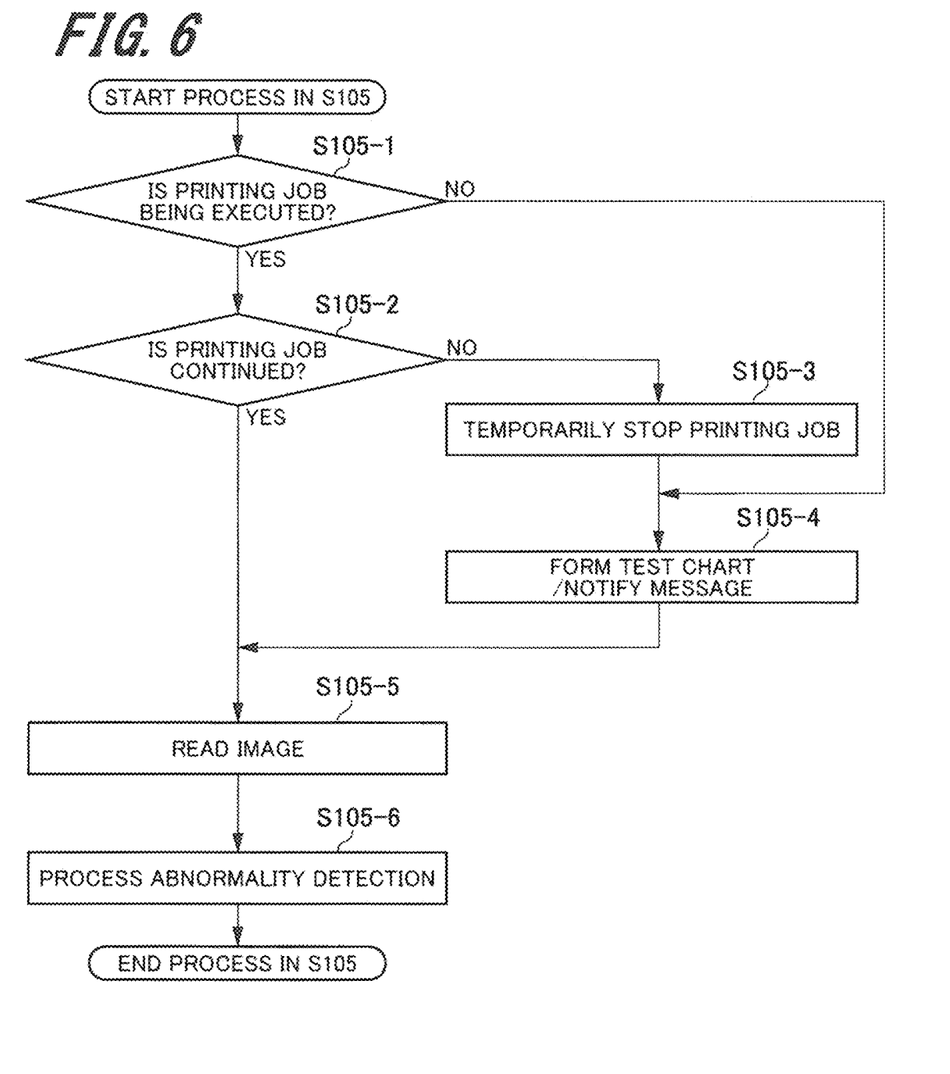
FIG. 6 is a flowchart (2) illustrating the control method of the image forming system according to an embodiment of the present invention.

In step S105, the image diagnosing portion 102d performs the image diagnosis process. FIG. 6 is a flowchart (2) illustrating the control method of the image forming system according to the embodiment of the present invention, and illustrates a flow explaining the image diagnosis process performed by the image diagnosing portion 102d. The procedure of the image diagnosis process performed in the control method of the image forming system 1 will be described below according to the flowchart in FIG. 6 with reference to FIGS. 1 to 4 previously illustrated and other necessary drawings.

Step S105-1

In step S105-1, the image diagnosing portion 102d determines whether or not the printing job is being executed now. When the image diagnosing portion 102d determines that the printing job is being executed (YES), it goes to step S105-2. On the other hand, when the image diagnosing portion 102d determines that the printing job is not being executed (NO), it goes to step S105-4.

Step S105-2

In step S105-2, the image diagnosing portion 102d determines whether or not the printing job that is being executed is continued. This determination is performed on the basis of the abnormality detected by the abnormality signal detecting portion 102b in step S101.

That is, when the abnormality detected by the abnormality signal detecting portion 102b in step S101 is the previously set abnormality and is the abnormality that is easily detected in the image diagnosis using the test chart, the image diagnosing portion 102d determines that the job is not continued (NO), and goes to step S105-3. Such an abnormality is, for example, the abnormality of the stabilization process due to the stain of the image density sensor 36 and the abnormality of the main body cooling portion 109. When the abnormality is the abnormality other than that, the image diagnosing portion 102d determines that the job is continued (YES), and goes to step S105-5.

Step S105-3

In step S105-3, the image diagnosing portion 102d performs the process for stopping the printing job that is being executed, and goes to subsequent step S105-4.

Step S105-4

In step S105-4, the image diagnosing portion 102d instructs the drive controlling portion 102e to form the test chart onto the recording medium P. In this case, the image diagnosing portion 102d instructs the drive controlling portion 102e to form the test chart according to the abnormality detected by the abnormality signal detecting portion 102b in step S101 previously illustrated. Thus, the drive controlling portion 102e operates each operating portion configuring the image forming portion 2, performs the image formation of the test chart onto the recording medium P, and goes to step S105-5 thereafter.

Figure 7:
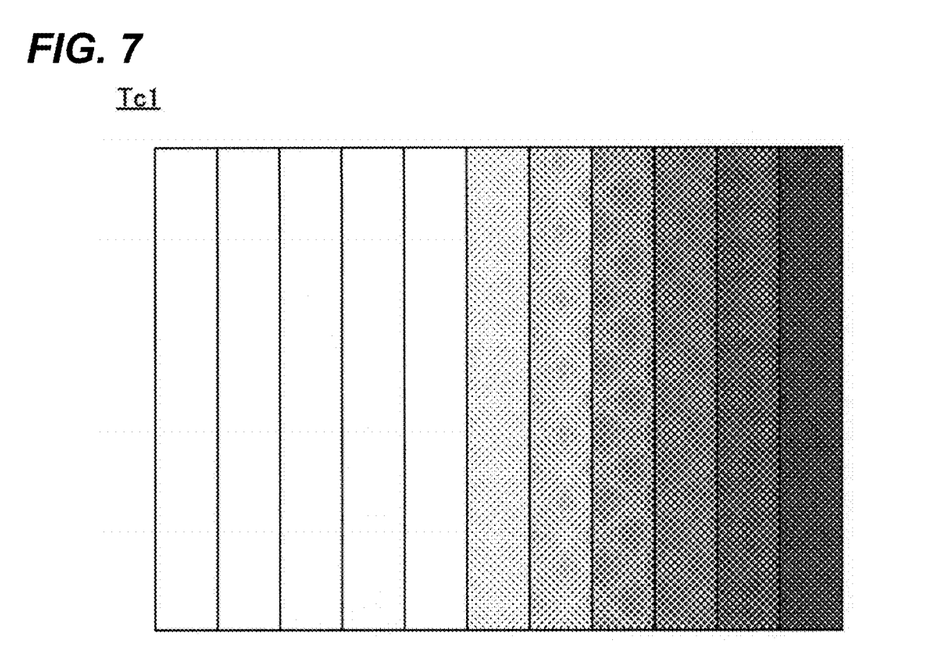
FIG. 7 is a diagram illustrating an example of a test chart formed in an image determination process according to an embodiment of the present invention.

FIG. 7 is a diagram illustrating an example of the test chart formed in the image determination process according to the embodiment of the present invention. The test chart illustrated in this drawing is the test chart of a tone pattern Tc1. Such a test chart is formed on the recording medium P when the abnormality detected by the abnormality signal detecting portion 102b in step S101 is the abnormality of the stabilization process due to the stain of the image density sensor 36.

Figure 8:
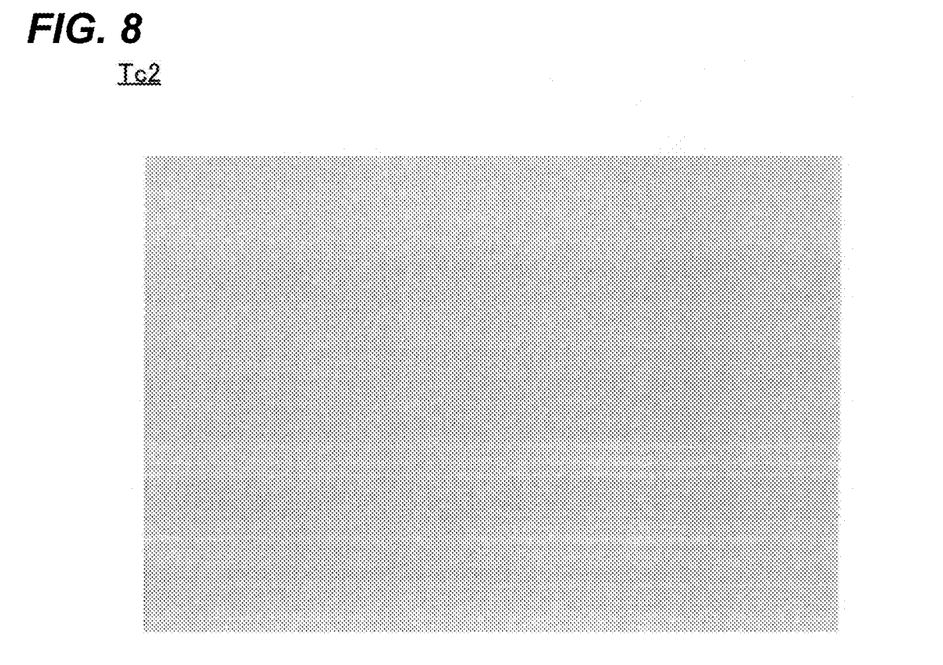
FIG. 8 is a diagram illustrating another example of the test chart formed in the image determination process according to an embodiment of the present invention.

Also, FIG. 8 is a diagram illustrating another example of the test chart formed in the image determination process according to the embodiment of the present invention. The test chart illustrated in this drawing is the test chart of a halftone chart Tc2. Such a test chart is formed onto the recording medium P when the abnormality detected by the abnormality signal detecting portion 102b in step S101 is the abnormality of the main body cooling portion 109.

Also, during the formation of the above test chart, the drive controlling portion 102e may notify that the test chart is being formed for the image diagnosis, to the display operating portion 101 or the external device connected to this image forming system 1.

Step S105-5

In step S105-5, the image diagnosing portion 102d causes the image reading portion 202 to read the image formed on the recording medium P. The image read here is one of the image formed on the recording medium P during the printing job and the test chart formed on the recording medium P.

Step S105-6

In step S105-6, the image diagnosing portion 102d compares the reading image data read by the image reading portion 202 and the reference image data stored in the storing portion 103, thereby detecting the abnormality of the reading image read by the image reading portion 202. In this case, according to the diagnosing content and the diagnosing point according to the abnormality detected by the abnormality signal detecting portion 102b in step S101, the image diagnosing portion 102d performs the image diagnosis as follows. It should be noted that the abnormality detected by the abnormality signal detecting portion 102b in step S101 corresponds to any one of the predetermined abnormalities.

That is, when the detected abnormality is the abnormality of the cleaning member of the electrically charging portion 23 in the image formation processing portion 105, a black stripe image sometimes appears on the image according to the stop position of the cleaning member.

Also, when the detected abnormality is the abnormality of the screw pump of the toner supplying portion 26, the image density of the image formed on the recording medium P tends to be lowered. For this, the image density of the reading image is detected to perform the image diagnosis.

Also, when the detected abnormality is the abnormality of the stabilization process due to the stain of the image density sensor 36, the toner density of the toner patch formed on the photosensitive drum 21 in the stabilization process is diagnosed to be higher than the actual toner density, so that the actual output image tends to be thinned. For this, the image density is detected in the test chart of the tone pattern Tc1 formed on the recording medium P (see FIG. 7). In the toner pattern Tc1, the comparison of the image densities of the reading image and the reference image is easy.

Further, when the detected abnormality is the abnormality of the main body cooling portion 109, image deletion is caused by the electric discharge product that can be generated on the photosensitive drum 21. For this, the image deletion is detected in the test chart of the halftone chart Tc2 (see FIG. 8). In the halftone chart Tc2, the detection of the image deletion is easy.

From the above, the image diagnosis process in succession illustrated in step S105-1 to step S105-6 is completed, and the process goes to step S106 illustrated in FIG. 5.

Step S106

In step S106, after the image diagnosis process in step S105, the abnormality determining portion 102c determines whether or not the image formed on the recording medium P is normal, and when the abnormality determining portion 102c determines that it is normal (YES), it goes to step S107. On the other hand, when the abnormality determining portion 102c determines that it is not normal (NO), it goes to step S103a to stop the printing operation of the image forming portion 2.

Step S107

In step S107, the abnormality determining portion 102c determines whether or not the abnormality determination process has been ended. In this case, when, for example, the power source of the image forming system 1 is turned off, the abnormality determining portion 102c determines that the abnormality determination process has been ended (YES), and ends the process in succession. On the other hand, when the abnormality determining portion 102c determines that the abnormality determination process has not been ended (NO), it goes to step S108.

Step S108

In step S108, the abnormality determining portion 102c determines whether or not the printing job is being executed. When the abnormality determining portion 102c determines that the printing job is being executed (YES), it goes to step S109. On the other hand, when the abnormality determining portion 102c determines that the printing job is not being executed (NO), it goes to step S109a.

Step S109a

In step S109a, the drive controlling portion 102e notifies the detection of the abnormality to the display operating portion 101 or the external device connected to this image forming system 1. In this case, together with the detection of the abnormality, the transmission source of the signal in which the abnormality has been detected, that is, the operating portion in which the abnormality has been detected, may be notified. The abnormality notified here is any one of the predetermined abnormalities. Thereafter, the drive controlling portion 102e goes to step S110.

Step S109

Figure 9:
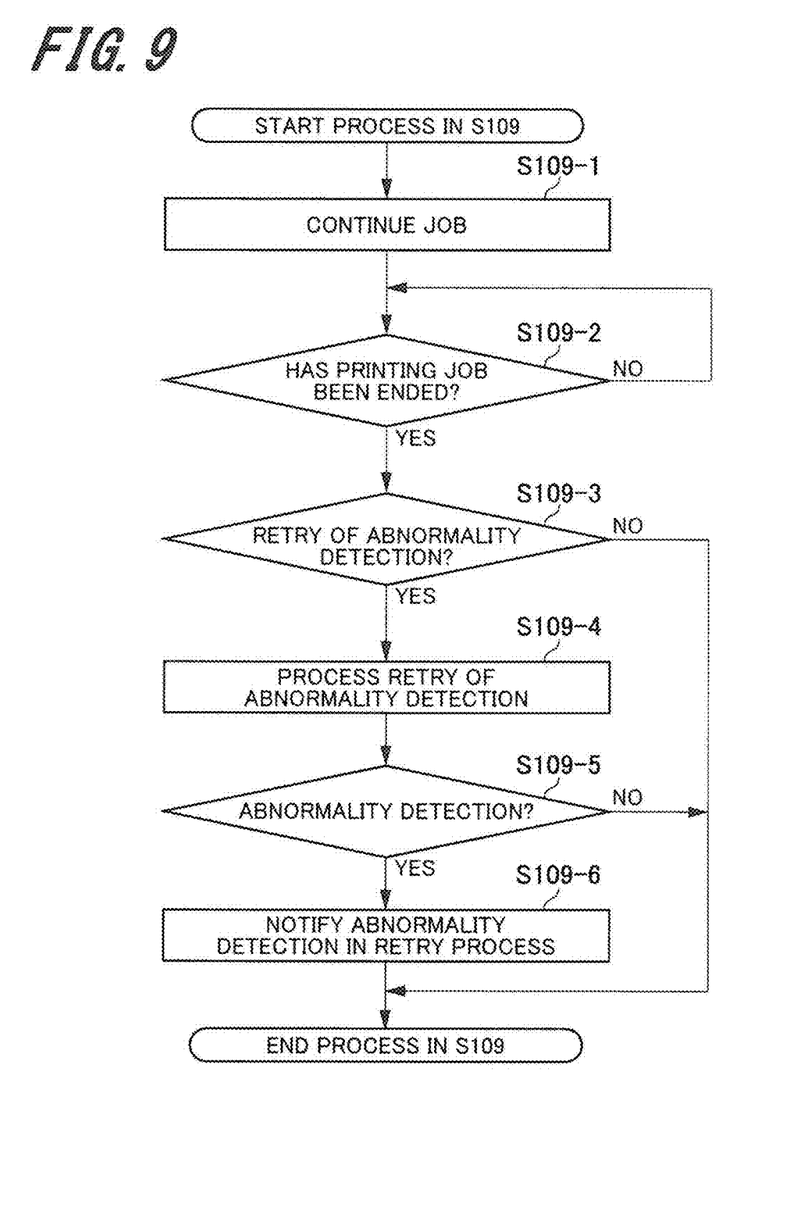
FIG. 9 is a flowchart (3) illustrating the control method of the image forming system according to an embodiment of the present invention.

On the other hand, in step S109, the abnormality determining portion 102c instructs the drive controlling portion 102e to continue the printing job, so that the drive controlling portion 102e performs the continuation process of the printing job. FIG. 9 is a flowchart (3) illustrating the control method of the image forming system according to the embodiment of the present invention, and illustrates a flow explaining the continuation process of the printing job. The procedure for the continuation process of the printing job performed in the control method of the image forming system 1 will be described below according to the flowchart in FIG. 9 with reference to FIGS. 1 to 4 previously illustrated and other necessary drawings.

Step S109-1

In step S109-1, the drive controlling portion 102e continues the printing job. However, when the printing job is temporarily stopped in step S105-3 previously illustrated (see FIG. 6), the temporarily stopped printing job is restarted to continue the printing job.

Step S109-2

In step S109-2, the drive controlling portion 102e determines whether or not the printing job has been ended, and continues the determination and is standby until it determines that the printing job has been ended (YES). When the drive controlling portion 102e determines that the printing job has been ended (YES), it goes to subsequent step S109-3.

Step S109-3

In step S109-3, the abnormality determining portion 102c determines whether or not the abnormality detection process is retried. This determination is performed on the basis of the abnormality detected by the abnormality signal detecting portion 102b in step S101.

That is, when the abnormality detected by the abnormality signal detecting portion 102b in step S101 is the previously set abnormality, the abnormality determining portion 102c determines that the abnormality detection process is retried (YES), and goes to step S109-4. Such an abnormality is, for example, the abnormality of the cleaning member of the electrically charging portion 23 in the image formation processing portion 105 or the abnormality of the main body cooling portion 109.

On the other hand, when the abnormality is the abnormality other than that, the abnormality determining portion 102c determines that the abnormality detection process is not retried (NO), and ends the process in step S109, and goes to step S110 in FIG. 5.

Step S109-4

In step S109-4, the drive controlling portion 102e performs the abnormality detection retry process of the abnormality detected by the abnormality signal detecting portion 102b in step S101. In this case, the drive controlling portion 102e causes the load operation of the abnormality detected by the abnormality signal detecting portion 102b in step S101 to be performed. That is, the drive controlling portion 102e operates the operating portion that is the transmission source of the signal related to the abnormality detected by the abnormality signal detecting portion 102b in step S101, analyzes the signal transmitted from the operating portion or the signal transmitted from each of the detecting portions S1 to S3 provided in the operating portions, and performs the abnormality detection process by the analysis of each of these signals.

Step S109-5

In step S109-5, the abnormality signal detecting portion 102b determines whether or not the abnormality has been detected, and when the abnormality signal detecting portion 102b determines that the abnormality has been detected (YES), it goes to step S109-6. On the other hand, when the abnormality signal detecting portion 102b determines that the abnormality has not been detected (NO), it ends the process in step S109 to go to step S110 in FIG. 5.

Step S109-6

In step S109-6, the drive controlling portion 102e notifies that the abnormality has been detected in the abnormality detection retry process, to the display operating portion 101 or the external device connected to this image forming system 1. In this case, together with the detection of the abnormality, the operating portion or the detecting portion (sensor) that is the transmission source of the signal in which the abnormality has been detected may be notified. Thereafter, the process in step S109 is ended to go to step S110 in FIG. 5.

It should be noted that between step S109-5 and step S109-6, the process in step S104 and step S104a illustrated in FIG. 5 may be performed to perform the process for stopping the load operation in which the abnormality has been detected in the retry process.

Step S110

In step S110, the drive controlling portion 102e accepts the printing job. Thereafter, the process returns to step S101, and the abnormality determining portion 102c is standby until it determines that the abnormality signal has been detected by the detecting portion (YES), and repeats the later steps.

Effects of the Embodiments

According to the embodiments described above, when the abnormality signal detecting portion 102b has detected the abnormality of each operating portion on the basis of the signal from each operating portion of the image forming portion 2 or the signal from each of the detecting portions S1 to S3 provided in the respective operating portions, it determines the continuation or stop of the printing operation of the image forming portion 2 on the basis of the diagnosis result of the image formed on the recording medium P by the printing operation of the image forming portion 2. Thus, even when the abnormality of each operating portion of the image forming portion 2 has been detected, when the output image is not affected thereby, the printing operation of the image forming portion 2 can be continued, so that it is possible to prevent unnecessary down time and spoiled paper from being caused. As a result, the productivity of the image forming system can be improved.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

1 . . . image forming system
101 . . . notifying portion
102 . . . controlling portion
102b . . . abnormality signal detecting portion
102e . . . drive controlling portion
105 . . . image formation processing portion (image forming portion)
106 . . . fixing portion (image forming portion)
107 . . . medium supplying portion (image forming portion)
108 . . . medium conveying portion (image forming portion)
109 main body cooling portion (image forming portion)
110 . . . medium supplying unit (image forming portion)
202 . . . reading portion
P . . . recording medium
S1 to S3 . . . detecting portion
Tc1 . . . tone pattern (test chart)
Tc2 . . . halftone chart (test chart)

What is claimed is:

1. An image forming system comprising:
an image forming apparatus;
a sensor for detecting a predetermined abnormality related to the image forming apparatus, the sensor being provided in the image forming apparatus;
a reading apparatus generating reading image data by reading an image formed on a recording medium by a printing operation of the image forming apparatus; and
a hardware processor configured to
continue a printing operation when the predetermined abnormality has been detected by the sensor,
determine whether the image formed on the recording medium by the printing operation of the image forming apparatus has an abnormality on the basis of the reading image data generated by the reading apparatus, and
at the detection of the abnormality on the basis of the image read by the reading apparatus, stop the printing operation of the image forming apparatus and provide a notification related to the abnormality on the basis of the reading image data generated by the reading apparatus.

2. The image forming system according to claim 1, wherein when the sensor detects an abnormality related to the image forming apparatus that is not the predetermined abnormality, the hardware processor stops the printing operation of the image forming apparatus and provides a notification related to the detected abnormality.

3. The image forming system according to claim 2, wherein the hardware processor performs switching, according to the type of the predetermined abnormality, such that a load corresponding to the predetermined abnormality detected by the sensor is immediately stopped or is stopped after the abnormality has been detected on the basis of the image read by the reading apparatus.

4. The image forming system according to claim 1, wherein the predetermined abnormality detected by the sensor is an abnormality in which at least the image forming apparatus can convey the recording medium, and that does not lead to mechanical damage.

5. The image forming system according to claim 1, wherein when the predetermined abnormality has been detected by the sensor during a job-related printing operation of the image forming apparatus related to a job, the hardware processor is configured to continue the operation of the image forming apparatus, at least for the job.

6. The image forming system according to claim 5, wherein when the predetermined abnormality has been detected by the sensor by performing the abnormality detection again at the completion of the job-related printing operation of the image forming apparatus, the hardware processor performs the notification related to the abnormality, and when the abnormality has not been detected, the hardware processor performs a new job to continue the operation of the image forming apparatus.

7. The image forming system according to claim 1, wherein when the predetermined abnormality has been detected by the sensor in the state where the printing operation of the image forming apparatus is not being performed, the hardware processor causes the printing operation of the image forming apparatus to print a predetermined chart onto the recording medium, causes the reading apparatus to read the predetermined chart formed on the recording medium, and at the detection of the abnormality on the basis of the image read by the reading apparatus, stops the printing operation of the image forming portion and provides the notification related to the abnormality.

8. The image forming system according to claim 7, wherein the hardware processor decides the predetermined chart according to the predetermined abnormality detected by the sensor.

9. The image forming system according to claim 7, wherein while causing the printing operation of the image forming apparatus to form the predetermined chart onto the recording medium, the hardware processor notifies that the predetermined chart is being formed.

10. The image forming system according to claim 1, wherein when the predetermined abnormality has been detected by the sensor during the printing operation of the image forming apparatus, the hardware processor is configured to cause the printing operation of the image forming apparatus to form a predetermined chart onto the recording medium, causes the reading apparatus to read the predetermined chart formed on the recording medium, and at the detection of the abnormality on the basis of the reading image data generated from the predetermined chart by the reading apparatus, stops the printing operation of the image forming apparatus and provides the notification related to the abnormality.

11. The image forming system according to claim 1, wherein when the predetermined abnormality has been detected by the sensor in the state where the printing operation of the image forming apparatus is not being performed, the hardware processor provides a notification that a new job of the image forming apparatus is to be accepted, and then accepts the operation related to the new job.

12. The image forming system according to claim 1, wherein when the abnormality is detected on the basis of the reading image data generated by the reading apparatus, the hardware processor changes the diagnosing content and the diagnosing point of the image for detecting the abnormality according to the abnormality detected by the detecting apparatus.

13. The image forming system according to claim 1, wherein the image forming apparatus includes a plurality of operating portions, the sensor is arranged in one of the operating portions, and the sensor detects an abnormality of the one of the operating portions.

14. A control method of an image forming system including an image forming apparatus and a sensor provided in the image forming apparatus, the sensor detecting an abnormality related to the image forming apparatus, and a reading apparatus for generating reading image data by reading an image formed on a recording medium by a printing operation of the image forming apparatus, wherein
when a predetermined abnormality has been detected by the sensor, the hardware processor continues the printing operation of the image forming apparatus,
determines whether the image formed on the recording medium by the printing operation of the image forming apparatus has an abnormality on the basis of the reading image data generated by the reading apparatus, and
at the detection of the abnormality on the basis of the reading image data generated by the reading apparatus, stops the printing operation of the image forming portion provides a notification related to the abnormality.

15. A non-transitory computer readable medium storing instructions for an image forming system including an image forming apparatus, a sensor detecting an abnormality related to the image forming apparatus, and a reading apparatus generating reading image data by reading an image formed on a recording medium by a printing operation of the image forming apparatus, the the instructions are executable by a hardware processor to perform a process comprising the steps of:
when a predetermined abnormality has been detected by the sensor, continuing the printing operation of the image forming portion,
determining whether the image formed on the recording medium by the printing operation of the image forming apparatus has an abnormality on the basis of the reading image data generating by the reading apparatus, and
at the detection of the abnormality on the basis of the reading image data generated by the reading apparatus, stopping the printing operation of the image forming portion and providing a notification related to the abnormality.

* * * * *